_United States Patent_ [19]

Aquino

[11] Patent Number: 5,052,113

[45] Date of Patent: Oct. 1, 1991

[54] VEHICLE LANE AND PARKING GUIDE

[76] Inventor: John R. Aquino, 1837 No. 74th Ct., Elmwood Park, Ill. 61529

[21] Appl. No.: 621,279

[22] Filed: Nov. 30, 1990

[51] Int. Cl.$^5$ .............................................. G01C 3/00
[52] U.S. Cl. ................................... 33/264; 116/28 R
[58] Field of Search ................ 33/264, 600; 116/28 R

[56] References Cited

U.S. PATENT DOCUMENTS

| | | | |
|---|---|---|---|
| 1,871,532 | 8/1932 | Kenna | 33/264 |
| 2,360,368 | 10/1944 | Rubissow | 33/264 |
| 2,584,777 | 2/1952 | Adolfson | 33/264 |
| 2,681,633 | 6/1954 | Basso | 116/28 R |
| 3,199,487 | 8/1965 | Heinkel . | |
| 3,310,023 | 3/1967 | Linsley | 116/28 R |
| 3,434,214 | 3/1969 | Pratt | 33/264 |
| 3,834,036 | 9/1974 | Scarritt, Sr. | 33/264 |
| 4,016,653 | 4/1977 | Bartlee | 33/264 |
| 4,079,519 | 3/1978 | Carmouche | 33/264 |
| 4,677,753 | 7/1987 | Loggers | 33/264 |
| 4,928,393 | 5/1990 | Van Schaack | 33/264 |

_Primary Examiner_—Allan N. Shoap
_Assistant Examiner_—Alvin Wirthlin
_Attorney, Agent, or Firm_—Willian Brinks Olds Hofer Gilson & Lione

[57] ABSTRACT

A vehicle lane and parking guide includes a mat which defines left and right guide lines. The mat is placed on the upper ledge of an instrument panel with the left and right guide lines on respective sides of the steering wheel column, thereby forming a low profile guide which assists a driver in positioning his vehicle within a lane and in parking.

10 Claims, 2 Drawing Sheets

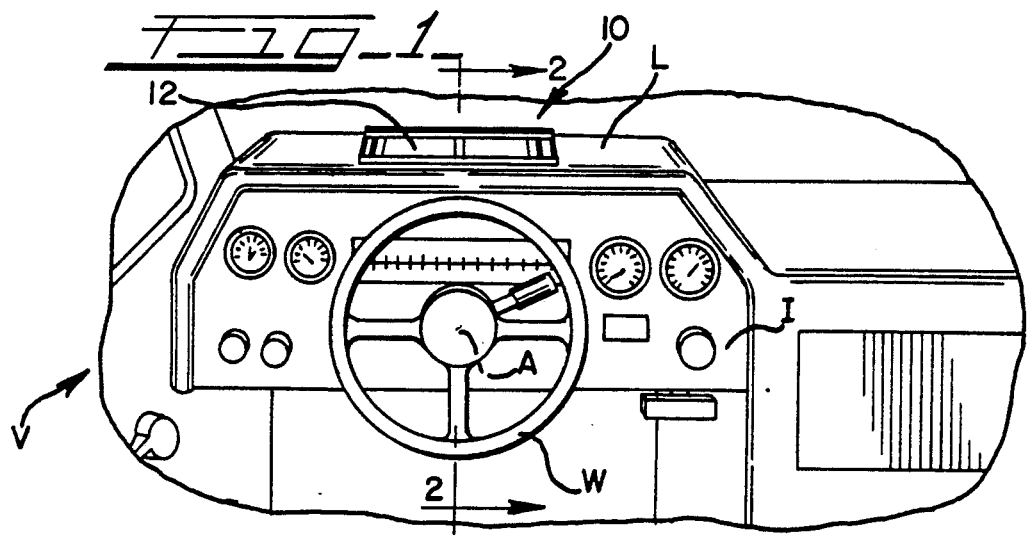
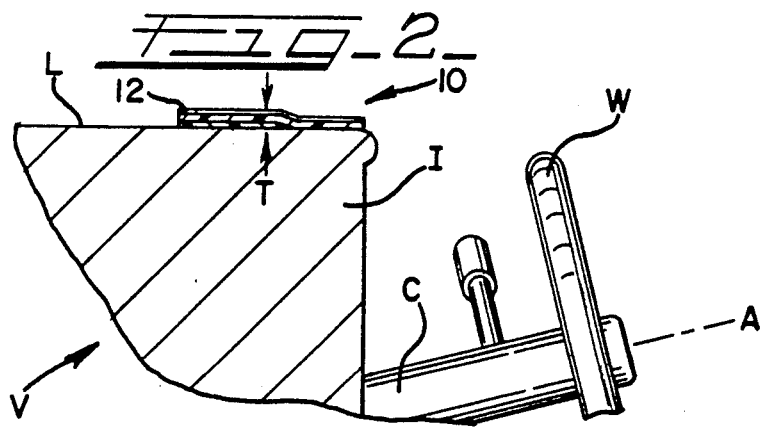
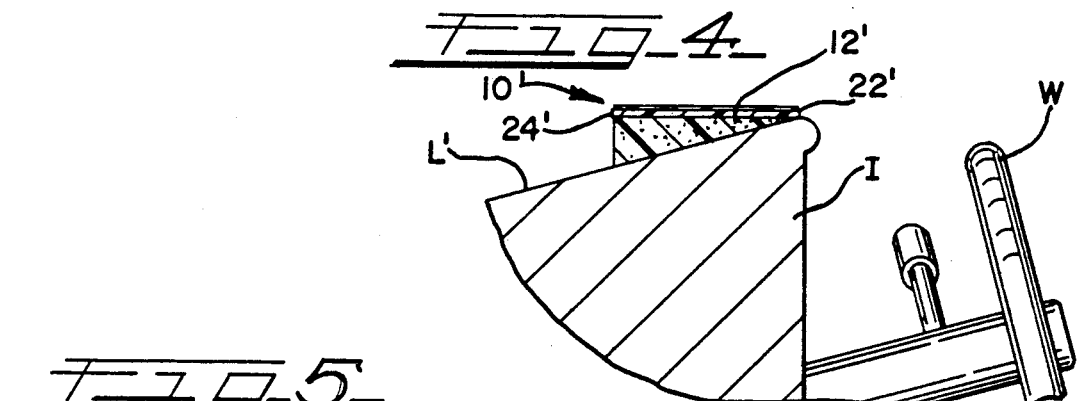
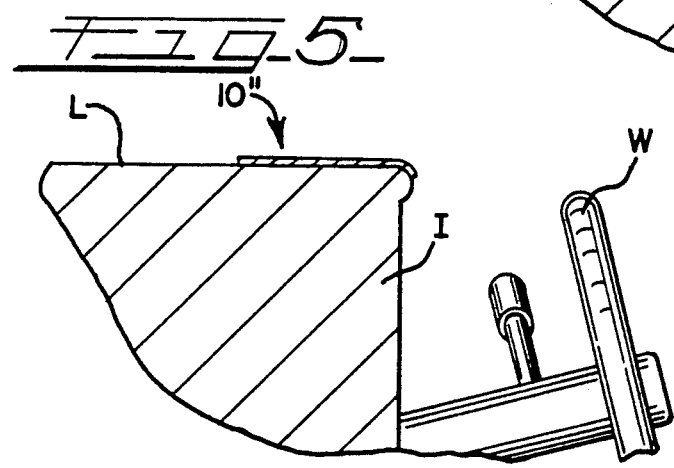

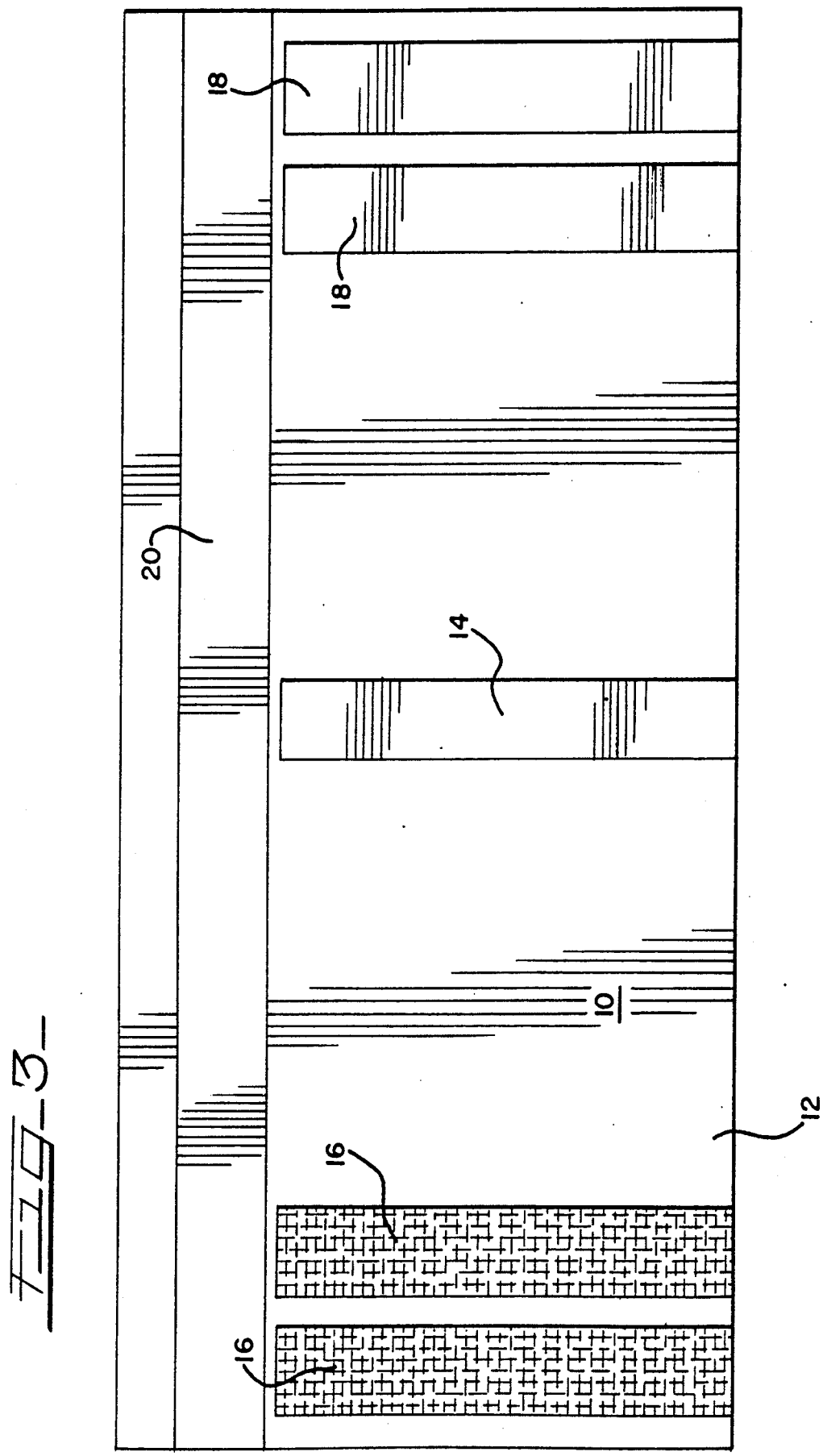

VEHICLE LANE AND PARKING GUIDE

BACKGROUND OF THE INVENTION

This invention relates to a vehicle lane and parking guide that can be used to assist a driver in positioning a vehicle within a lane of traffic and in parking the vehicle.

Several approaches have been suggested in the past for automotive lane and parking guides. One approach is to position a sight or guide either directly on or immediately adjacent to the windshield, substantially above the upper surface of the instrument panel. See for example Bartlett, U.S. Pat. No. 4,016,653; Van Schaack, U.S. Pat. No. 4,928,393; Scarritt, U.S. Pat. No. 3,834,036; and Heinkel, U.S. Pat. No. 3,199,487. These guides are positioned directly in the field of view of the driver when looking through the windshield of the vehicle, and they may present a distracting obstruction to the driver.

A second approach is to mount guides or sights on the hood or fenders of an automobile. See for example the guides shown in Carmouche, U.S. Pat. No. 4,079,519; Scarritt, U.S. Pat. No. 3,834,036; and Kenna, U.S. Pat. No. 1,871,532. Because the guides or sights are positioned on the exterior bodywork of the vehicle, rain, snow or ice may interfere with the driver's ability to see the guide or sight clearly.

A third approach is to mount an upstanding pointer directly onto the instrument panel. Note for example FIG. 13 of the Van Schaack patent identified above and the Kenna patent identified above. Because these pointers extend substantially above the upper surface of the instrument panel, they may create a distraction to the driver and they may be misadjusted if bumped. Furthermore, a mounting must be provided which is of adequate rigidity to support the pointer in its upright position.

The present invention is directed to an improved lane and parking guide which overcomes the disadvantages of the prior art discussed above.

SUMMARY OF THE INVENTION

The present invention relates to a lane and parking guide for an automotive vehicle of the type having a steering wheel and an instrument panel, wherein the steering wheel defines a longitudinal axis and the instrument panel has an upper ledge which extends on both sides of the longitudinal axis.

According to this invention, means are provided for defining at least one low profile guide line disposed on the upper ledge on at least one side of the longitudinal axis such that the guide line extends along the upper ledge without extending any substantial distance above the upper ledge. The guide line is positioned and has a color such that the guide line can readily be seen by a driver behind the steering wheel, and the guide line is positioned to assist the driver in properly positioning the vehicle on a roadway.

BRIEF DESCRIPTION OF THE DRAWINGS

FIG. 1 is a perspective view of a presently preferred embodiment of the vehicle lane and parking guide of this invention in place on an instrument panel of an automotive vehicle.

FIG. 2 is a cross-sectional view taken along line 2—2 of FIG. 1.

FIG. 3 is a plan view of the guide of FIG. 1.

FIG. 4 is a cross-sectional view of a second preferred embodiment of this invention.

FIG. 5 is a cross sectional view of a third preferred embodiment of this invention.

DETAILED DESCRIPTION OF THE PRESENT PREFERRED EMBODIMENTS

Turning out to the drawings, FIGS. 1 and 2 show a portion of a vehicle V including an instrument panel I and a steering wheel W. The steering wheel W includes a steering wheel column C which defines a longitudinal axis A. The instrument panel I includes an upper ledge L which in this example is substantially horizontal.

A guide 10 is mounted on the upper ledge L, and the guide 10 represents a presently preferred embodiment of this invention. The guide 10 includes a mat 12 which defines a number of lines as shown most clearly in FIG. 3. An alignment line 14 is centered on the mat 12 and is positioned in the vertical plane passing through the longitudinal axis A. Left and right guide lines 16, 18 are arranged parallel to the alignment line 14 on the left and right sides of the alignment line 14, respectively. In this embodiment the left guide lines 16 include a pair of parallel lines which are preferably yellow in color and the right guide lines 18 include a pair of guide lines parallel to one another, which in this embodiment are preferably white in color. The mat 12 also defines a transverse guide line 20 oriented transversely to the alignment line 14 and the longitudinal axis A and extending between the left and right guide lines 16, 18 on the edge of the mat 12 remote from the steering wheel W.

The mat 12 is held securely in place on the upper ledge L. A variety of approaches can be used, depending upon the particular application. For example, the mat 12 can be retained in place by a hook and loop fastener such as that sold under the trade name Velcro, by a suitable adhesive, or by a suitable mechanical bracket or fastener. For example, double sided tape, adhesive, or threaded fasteners such as screws can be used. The mat 12 is intended for use with a substantially horizontal upper ledge L, and has a substantially uniform mat thickness T.

In some cases the upper ledge of an instrument panel of an automotive vehicle is not horizontal, but instead slopes downwardly away from the driver. FIG. 4 shows a guide 10' suitable for use with a ledge L' which slopes away from the driver. As shown in FIG. 4, the guide 10' includes a mat 12' having a front surface 22' and a rear surface 24'. The mat 12' is wedge shaped, being thicker at the rear surface 24' than at the front surface 22'. In this way, the upper surface of the mat 12' is supported so as to be clearly visible by the driver. The mat 12' preferably defines guide and alignment lines as shown in FIG. 3.

The mats 12, 12' are well suited for after-market applications, because they allow a user to align and position the guide 10, 10' without assistance. However, it is not essential in all embodiments that the guide lines be formed on a mat. For example, individual ones of the guide lines may be separately secured to the upper ledge L, L'. Alternately, as shown in FIG. 5, this invention may be embodied in a painted guide 10" in which the left and right guide lines are painted or adhesively secured directly to the upper ledge L of the instrument panel.

Simply by way of example and in order better to define the presently preferred embodiment of this invention, the guide lines 16, 18 are preferably approximately 4 inches in length and the left and right guide lines 16, 18 are separated by approximately 9½ inches (edge to edge). The paired guide lines on each side are preferably separated by about one inch center to center, with an edge to edge separation of approximately ¼ inch.

A wide variety of materials can be used to form the guide lines and mats described above. For example, the mats can be formed of synthetic material such as plastics or elastomers. Additionally, suitable metal, wood or paper board products may be used. The guide lines may be formed of paints, inks, tapes or other colored elements as desired.

During day light operation ambient light illuminates the guides 10, 10', 10" and allows the driver to clearly see the guide lines. Preferably, the guide lines are formed with a contrasting color to the mat 12, 12'. For example, the mat 12, 12' may be black in color and the guide lines may be of a contrasting color, such as the yellow and white colors suggested above. Illumination may be provided when the guides 10, 10', 10" are intended for use at night. For example, direct (front side) illumination can be provided with a suitably positioned lamp. Alternately, the guide lines may be designed for back surface illumination, wherein a lamp is mounted behind the guide lines and the guide lines themselves are translucent.

In operation, the guides 10, 10', 10" assist the driver in locating the vehicle within a lane, and in parking the vehicle. As pointed out above, the alignment line 14 is aligned with the longitudinal axis A of the steering wheel column C. The left and right guide lines are positioned to form reference marks for the driver. When looking at the roadway with the guide lines in view, the driver can easily compare the guide lines with the lane lines on the roadway or with a curb adjacent the roadway. A driver quickly comes to recognize the preferred spatial relationship between the guide lines and the lane lines or curb, and he can then use the guide lines to assist him in properly positioning the vehicle.

The preferred embodiments described above provide significant advantages in assisting the driver to locate the vehicle both when driving and parking. It is anticipated that the use of this guide will allow a driver to maintain his vehicle within the desired lane, thereby reducing collision hazards. Two cars approaching one another will be more nearly centered within the respective lanes, and will therefore be separated by a greater distance from one another. In particular, the driver can use the guide lines 16, 18 to center the vehicle in the lane and to avoid crossing the center line. The guide lines help the driver to center the vehicle regardless of the width of the lane, on both straight and curving roadways. At corners, a driver can use the guide to insure that the vehicle stays within the lane when making a right or left turn. Because the driver can maintain the vehicle more nearly centered in a lane, the vehicle will cross lane lanes less often, thereby reducing wear and deterioration of lane lines and possibly reducing lane line maintenance.

Furthermore, since the guides 10, 10', 10" are mounted inside the vehicle on the upper ledge of the instrument panel, they are easily seen regardless of weather, and they require no alteration of exterior body-work. Since the guides 10, 10', 10" are low profile, they never obstruct the driver's vision and they are not in the way. Furthermore, the guides 10, 10', 10" are easy to mount in place. The mats 12, 12' are well suited for aftermarket applications, and both the mats 12, 12' and the directly applied guide 10' are well suited for original equipment applications.

Of course, it should be understood that a wide range of changes and modifications can be made to the preferred embodiments described above. For example, not all of the guide lines 16, 18, 20 are required, and if desired the transverse guide line 20 can be eliminated. Additionally, the left and right guide lines 16, 18 do not have to be paired lines, and the alignment line 14 can be eliminated, particularly in a permanently mounted guide. As pointed out above, materials, colors, and dimensions can all be varied to suit the intended application. It is therefore intended that the foregoing detailed description be regarded as illustrative rather than limiting, and that it be understood that it is the following claims, including all equivalents, which are intended to define the scope of this invention.

I claim:

1. In an automotive vehicle of the type comprising a steering wheel and an instrument panel, said steering wheel defining a longitudinal axis, said instrument panel having an upper ledge which extends on both sides of the longitudinal axis, the improvement comprising:
   means for defining at least two substantially flat, low profile guide lines disposed substantially horizontally on the upper ledge, each extending generally parallel to the longitudinal axis on a respective side of the longitudinal axis such that the guide lines extend along the upper ledge without extending any substantial distance above the upper ledge, said guide lines positioned and having a color such that the guide lines are in the direct line of sight of a driver behind the steering wheel and can readily be seen by the driver, and said guide lines positioned to assist the driver in properly positioning the vehicle on a roadway.

2. In an automotive vehicle of the type comprising a steering wheel and an instrument panel, said steering wheel defining a longitudinal axis, said instrument panel having an upper ledge which extends on both sides of the longitudinal axis, the improvement comprising:
   mans for defining at least two substantially flat, low profile guide lines disposed at least in part of the front edge of the upper ledge, each extending generally parallel to the longitudinal axis on a respective side of the longitudinal axis such that the guide lines extend along the upper ledge without extending any substantial distance above the upper ledge, said guide lines positioned and having a colo such that the guide lines are in the direct line of sight of a driver behind the steering wheel and can readily be seen by the driver, and said guide lines positioned to assist the driver in properly positioning the vehicle on a roadway.

3. The invention of claim 1 or 2 wherein the defining means defines two pair of guide lines, each pair extenidng generally parallel to the longitudinal axis on a respective side of the longitudinal axis.

4. The invention of claim 3 wherein one pair of guide lines is yellow in color and the other pair of guide lines is white in color.

5. The invention of claim 3 wherein the defining means further defines a transverse guide line oriented transverse to the longitudinal axis.

6. The invention of claim 3 wherein the defining means comprises a mat, wherein each guide line is formed on the mat, and wherein the mat is configured to lie on the upper ledge.

7. The invention of claim 6 wherein the invention further comprises an alignment line formed on the mat aligned with the longitudinal axis.

8. The invention of claim 7 wherein the mat defines a thickness which is substantially constant.

9. The invention of claim 7 wherein the mat is wedge shaped in cross section.

10. The invention of claim 2 wherein each guide line is applied directly to the upper ledge.

* * * * *

UNITED STATES PATENT AND TRADEMARK OFFICE
CERTIFICATE OF CORRECTION

PATENT NO. : 5,052,113
DATED : October 1, 1991
INVENTOR(S) : John R. Aquino

It is certified that error appears in the above-identified patent and that said Letters Patent is hereby corrected as shown below:

On the Title page, item [56], col. 2, under "References Cited" please delete "Bartlee" and substitute therefor --Bartlett--.

In claim 2, line 6, please delete "mans" and substitute therefor --means--; line 7, please delete "of" and substitute therefor --at--; and line 13, please delete "colo" and substitute therefor --color--.

In claim 3, lines 2 and 3, please delete "extenidng" and substitute therefor --extending--.

In claim 10, line 1, before "2" please insert --1 or--.

Signed and Sealed this

Tenth Day of August, 1993

Attest:

MICHAEL K. KIRK

Attesting Officer

Acting Commissioner of Patents and Trademarks